(12) United States Patent
Miller et al.

(10) Patent No.: US 6,640,148 B1
(45) Date of Patent: Oct. 28, 2003

(54) METHOD AND APPARATUS FOR SCHEDULED CONTROLLER EXECUTION BASED UPON IMPENDING LOT ARRIVAL AT A PROCESSING TOOL IN AN APC FRAMEWORK

(75) Inventors: Michael L. Miller, Cedar Park, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/160,894

(22) Filed: Jun. 3, 2002

(51) Int. Cl.⁷ .............................................. G06F 19/00
(52) U.S. Cl. ...................... 700/103; 700/110; 700/121
(58) Field of Search ................................. 700/103, 100, 700/108, 109, 121, 228, 117, 110; 705/8; 257/E21.525

(56) References Cited

U.S. PATENT DOCUMENTS

| | | | |
|---|---|---|---|
| 5,706,200 A | * 1/1998 | Kumar et al. | 700/100 |
| 6,154,711 A | * 11/2000 | Steffan et al. | 700/121 |
| 6,387,823 B1 | * 5/2002 | Sonderman et al. | 438/758 |
| 6,507,770 B2 | * 1/2003 | Tateyama et al. | |

* cited by examiner

*Primary Examiner*—Albert W. Paladini
(74) *Attorney, Agent, or Firm*—Williams, Morgan & Amerson, P.C.

(57) ABSTRACT

A method and apparatus for scheduled controller execution based upon impending lot arrival at a processing tool in an APC framework. It is determined which lot of processing pieces that is to be processed by a processing tool and the lot of processing pieces is retrieved from a remote location. A predefined set of calculations is initiated relating to the operation of the processing tool in anticipation of delivering the lot of processing pieces to the processing tool. The lot of processing pieces is delivered to the processing tool, and the processing pieces are processed by the processing tool using the predefined set of calculations.

21 Claims, 3 Drawing Sheets

METHOD AND APPARATUS FOR SCHEDULED CONTROLLER EXECUTION BASED UPON IMPENDING LOT ARRIVAL AT A PROCESSING TOOL IN AN APC FRAMEWORK

BACKGROUND OF THE INVENTION

1. Field of the Invention

This invention relates generally to semiconductor fabrication technology, and, more particularly, to a method and apparatus for scheduling execution of a controller based upon an impending lot arrival at a processing tool in an Advanced Process Control (APC) framework in a semiconductor fabrication environment.

2. Description of the Related Art

There is a constant drive in the semiconductor industry to increase the quality, reliability, and throughput of integrated circuit devices such as microprocessors, memory devices, and the like. This drive is fueled by consumer demands for higher quality computers and electronic devices that operate more reliably.

These demands by the consumer have resulted in some improvements in the manufacture of semiconductor devices as well as in the manufacture of integrated circuit devices incorporating such semiconductor devices. Reducing defects in the manufacture of these devices lowers the cost of the devices themselves. Accordingly, the cost of the final product incorporating these devices is also reduced, thus providing inherent monetary benefits to both the consumer and manufacturer.

Typically, several lots of wafers that are to be processed by a processing tool of the semiconductor manufacturing system are stored in a remote location from the processing tool, such as a wafer storage facility, for example. A manufacturing execution system (MES) will determine which of a particular lot of wafers needs to be processed by the processing tool subsequent to the tool running a current lot of wafers. When the desired lot of wafers is retrieved from the remote storage facility and delivered to the processing tool, the manufacturing execution system will have "recipe calculations" performed for the processing tool to run the desired lot of wafers retrieved from the remote storage facility. While these recipe calculations are being performed, the processing tool will remain idle until the recipe calculations are made. In some cases, the processing tool may remain idle for a period of sixty seconds, if not longer, as it awaits the recipe calculations to run the desired lot of wafers. The longer the processing tool remains idle while awaiting the recipe calculations, the greater the loss of productivity by the processing tool, which may adversely impact the overall operational costs associated with the semiconductor manufacturing system.

The present invention is directed to overcoming, or at least reducing the effects of, one or more of the problems set forth above.

SUMMARY OF THE INVENTION

In one aspect of the present invention, a method is provided. The method comprises determining a lot of processing pieces that is to be processed by a processing tool and retrieving the lot of processing pieces from a remote location. A predefined set of calculations is initiated relating to the operation of the processing tool in anticipation of delivering the lot of processing pieces to the processing tool. The lot of processing pieces is delivered to the processing tool, and the processing pieces are processed by the processing tool using the predefined set of calculations.

In another aspect of the present invention, a system is provided. The system comprises a processing tool adapted to process a lot of processing pieces and a first controller adapted to retrieve the lot of processing pieces from a remote location. A second controller is provided and adapted to control the processing tool and to determine the lot of processing pieces that is to be processed by the processing tool. The system also includes a third controller adapted to perform a predefined set of calculations relating to the operation of the processing tool, wherein the third controller initiates performance of the predefined set of calculations prior to receipt of the lot of processing pieces at the processing tool. The processing tool is further adapted to process the processing pieces using the predefined set of calculations in response to the processing pieces being delivered to the processing tool.

BRIEF DESCRIPTION OF THE DRAWINGS

The invention may be understood by reference to the following description taken in conjunction with the accompanying drawings, in which like reference numerals identify like elements, and in which.

Figure 1:
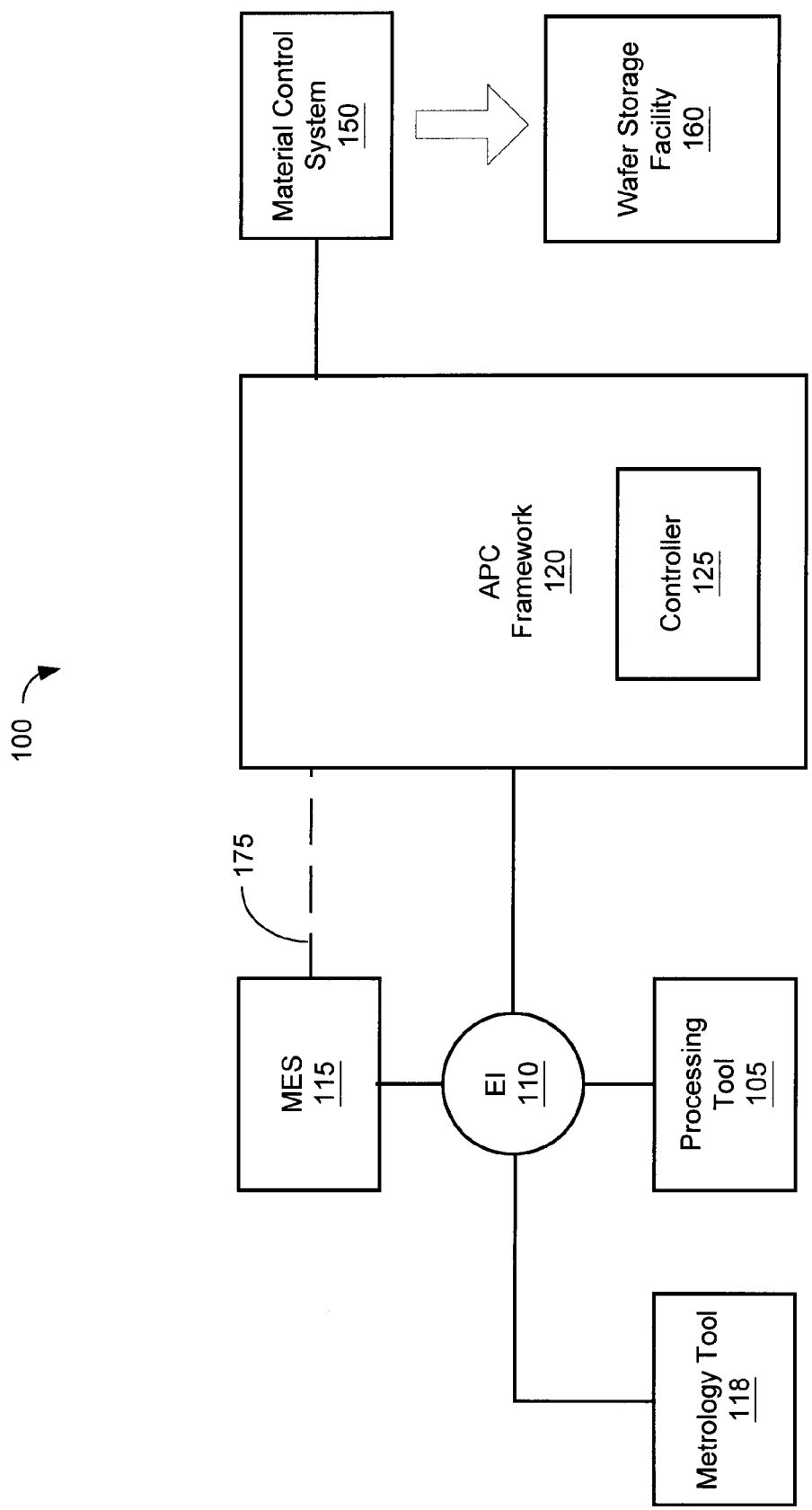
FIG. 1 illustrates a manufacturing system for processing a plurality of processing pieces by a processing tool in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a manufacturing system 100 for performing a semiconductor fabrication process is provided. The manufacturing system 100 includes a processing tool 105, which in the illustrated embodiment, is in the form of semiconductor fabrication equipment used to produce a processing piece, such as a silicon wafer. The processing tool 105, in accordance with one embodiment, may be an exposure tool, commonly known as a "stepper." It will be appreciated, however, that the processing tool 105 need not necessarily be limited to a stepper, or even to a tool for producing silicon wafers, but may include various other types of manufacturing equipment for producing a variety of different types of commercial products without departing from the spirit and scope of the present invention.

The processing tool 105 is coupled to an equipment interface (EI) 110, which interfaces the processing tool 105 to a manufacturing execution system (MES) 115. The manufacturing execution system 115 manages and controls the overall operation of the processing tool 105. For example, the manufacturing execution system 115 may determine what processes are to be performed by the processing tool 105, when these processes are to be performed, how these processes are to be performed, etc.

A metrology tool 118 may also be coupled to the equipment interface 110 to retrieve wafer product data that characterizes the quality of the wafer that is processed by the processing tool 105. The wafer product data is generated from specific quantitative and/or qualitative measurements that are taken from the wafer by the metrology tool 118. For example, the wafer product data may include film thickness measurements, line width measurements, and/or overlay offset measurements of the wafer. It will be appreciated that these specific measurements that define the wafer product data are merely exemplary. Accordingly, various other measurements that describe the quantitative or qualitative characteristics of the wafer may also be taken to determine whether the wafers that are being processed by the tool 105 possess the quantitative or qualitative characteristics desired. The specific manner in which the wafer product data is obtained by the metrology tool 118 is well known to those of ordinary skill in the art and the details of such will not be discussed herein to avoid unnecessarily obscuring the present invention.

The equipment interface 110 may retrieve the wafer product data from the metrology tool 118, and communicate this data to an Advanced Process Control (APC) framework 120, which may analyze the wafer product data at a controller 125 to determine whether certain operational parameters of the processing tool 105 need to be adjusted to optimize the quantitative and/or qualitative measurements of the wafer. The equipment interface 110 may further receive correctional data from the controller 125 of the APC framework 120, based upon the calculations performed using the wafer product data, such that the processing tool 105 may be re-calibrated to optimize the desired quantitative and/or qualitative measurements of the wafer being processed by the tool 105. The calculations made by the controller 125 for re-calibrating the processing tool 105 are known as "recipe calculations." The process by which these recipe calculations are performed is well established in the art.

Typically, the manufacturing execution system 115 will determine which particular lot of wafers needs to be processed by the processing tool 105 subsequent to the tool 105 running a current lot of wafers. After the manufacturing execution system 115 determines the particular lot of wafers that should run next on the processing tool 105, a wafer fab technician ("WFT") sends a message to a material control system 150, via an operator interface (not shown), for example, to have the material control system 150 retrieve the desired lot of wafers that is stored in a wafer storage facility 160. Typically, various lots of wafers are stored in the wafer storage facility 160 within a plurality of "stockers" (not shown), which may include several shelving units that accommodate the storage of the wafers. The material control system 150 usually includes robotic equipment that is capable of locating a desired lot of wafers within one of the stockers of the storage facility 160, and then removing the desired lot of wafers from the stocker in which the lot is stored for subsequent delivery to the processing tool 105.

In accordance with one embodiment of the present invention, the technician may go to the location of the wafer storage facility 160 and pick up the desired lot of wafers that was retrieved from the stocker by the material control system 150. The technician then may transport the lot of wafers to the processing tool 105 for subsequent processing by the tool 105. In an alternative embodiment, the process of retrieving the desired lot of wafers may be more automated, where the material control system 150 retrieves the desired lot of wafers from the stocker under the direction of the manufacturing execution system 115, and the lot of wafers may be transported to the processing tool 105 via an automated transport system (not shown) as opposed to being delivered by the technician.

Typically, when the desired lot of wafers is delivered to the processing tool 105, the technician informs the manufacturing execution system 115 via an operator interface, for example, that the lot of wafers is at the processing tool 105 such that the tool 105 may run the lot of wafers. The manufacturing execution system 115, upon receiving notification that the lot of wafers has arrived at the processing tool 105, sends a message to the equipment interface 110. The message from the manufacturing execution system 115 instructs the equipment interface 110 to send a message to the controller 125 of the APC framework 120 to perform the recipe calculations for the processing tool 105 for the particular process that is to be performed thereby. The controller 125 performs the recipe calculations for the processing tool 105 using the wafer product data from the metrology tool 105 in a manner that is well known to those of ordinary skill in the art. Subsequent to performing the recipe calculations for the processing tool 105, the controller 125 forwards the recipe calculations to the equipment interface 110, and the equipment interface 110 then forwards the recipe calculations to the processing tool 105 such that the tool 105 may adjust its processing parameters (i.e., re-calibrate itself) in accordance with the received recipe calculations that were sent by the controller 125.

When the lot of wafers is delivered at the processing tool 105 (via either by the wafer fab technician or an automated transport system), the tool 105 remains idle (i.e., does not process the wafers) until the recipe calculations are sent to the processing tool 105 by the controller 125 of the APC framework 120. That is, the manufacturing execution system 115 typically has the controller 125 perform the recipe calculations after the lot of wafers has been delivered to the processing tool 105, which will cause the tool 105 to remain idle until the recipe calculations are performed by the controller 125. In some cases, the processing tool 105 may remain idle for a period of sixty seconds, if not longer, as it awaits the recipe calculations performed by the controller 125. The longer the processing tool 105 remains idle while awaiting the recipe calculations from the controller 125, the greater the loss of productivity by the processing tool 105, which may adversely impact the overall operational costs associated with the manufacturing process of the system 100.

In accordance with the illustrated embodiment of the present invention, the controller 125 of the APC framework 120 is instructed by the manufacturing execution system 115 to perform the recipe calculations prior to the lot of wafers being delivered to the processing tool 105. In accordance with one embodiment, the recipe calculations are performed while the desired lot of wafers is being retrieved from the wafer storage facility 160 by the material control system 150. It will be appreciated, however, that the recipe calculations made by the controller 125 may be performed at any point prior to the arrival of the lot of wafers at the processing tool 105 without departing from the spirit and scope of the present invention.

Figure 2:
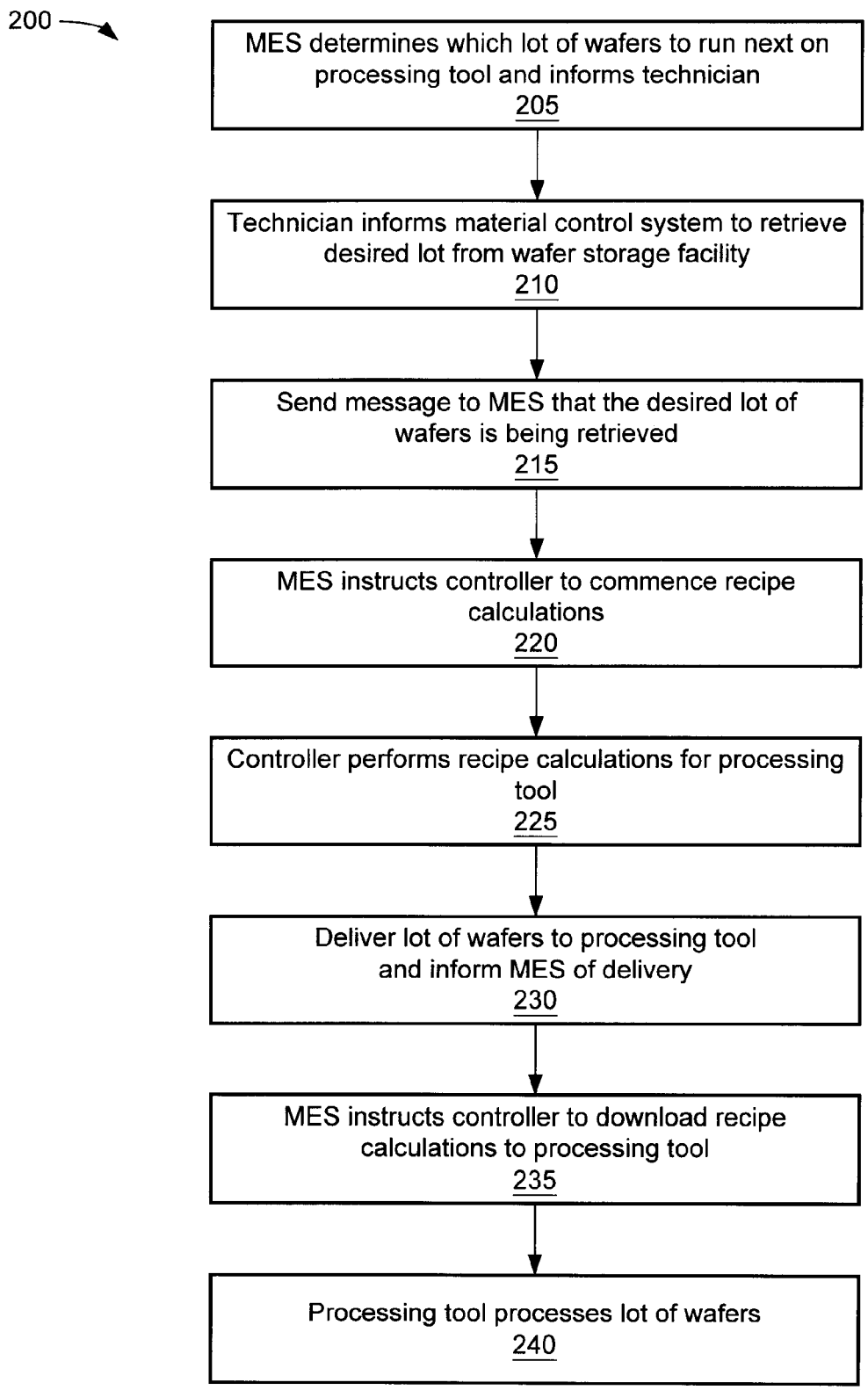
FIG. 2 shows a process performed by the manufacturing system of FIG. 1 in accordance with one embodiment of the present invention.

Turning now to FIG. 2, a process 200 that is performed by the manufacturing system 100 is shown in accordance with one embodiment of the present invention. The process 200 commences at block 205, where the manufacturing execution system 115 determines which lot of wafers needs to be processed on the next run by the processing tool 105, and the manufacturing execution system 115 informs the wafer fab technician of the particular lot that it has determined to run next on the processing tool 105. In accordance with one embodiment, the manufacturing execution system 115 may inform the wafer fab technician of the particular lot of wafers that should be processed next by the tool 105 via an operator interface (not shown), which the wafer fab technician uses to interact with the manufacturing execution system 115. In one example, the operator interface may take the form of a graphical user interface ("GUI"), which the technician may use to interact with the manufacturing execution system 115.

After the manufacturing execution system 115 informs the technician of the particular lot of wafers that is to run next on the processing tool 105, the technician informs the material control system 150 to retrieve the desired lot of wafers from the wafer storage facility 160 at block 210. In accordance with one embodiment, the technician may inform the material control system 150 to retrieve the desired lot of wafers via the operator interface. According to one embodiment of the present invention, a message is sent to the manufacturing execution system 115 at block 215 while the technician is informing the material control system 150 to retrieve the desired lot of wafers from the wafer storage facility 160. The message sent to the manufacturing execution system 115 at block 215 triggers the manufacturing execution system 115 to notify the controller 125 to begin the recipe calculations for the lot of wafers that the material control system 150 is retrieving for the technician. It will be appreciated, however, that the recipe calculations that are being performed by the controller 125 may commence at any point prior to the arrival of the lot of wafers at the processing tool 105 without departing from the spirit and scope of the present invention.

After the manufacturing execution system 115 receives notification that the technician has requested the desired lot of wafers from the material control system 150 at block 210, the manufacturing execution system 115 sends a message to the equipment interface 110 at block 220 to have the controller 125 commence the recipe calculations for the desired lot of wafers. The equipment interface 110, after receiving the message from the manufacturing execution system 115, sends a message to the controller 125 of the APC framework 120 requesting the controller 125 to perform the recipe calculations for the desired lot of wafers. In accordance with another embodiment of the present invention, the manufacturing execution system 115 may directly communicate with the APC framework 120 via communication line 175 (as shown in FIG. 1), as opposed to communicating with the framework 120 via the equipment interface 110, without departing from the spirit and scope of the present invention. At block 225, the controller 125 performs the recipe calculations for the processing tool 105. In accordance with one embodiment of the present invention, the controller 125 of the APC framework 120 performs the recipe calculations using the wafer product data that is obtained from the metrology tool 118. For example, the wafer product data may include film thickness measurements, line width measurements, and/or overlay offset measurements of the wafer. It will be appreciated that these specific measurements that define the wafer product data are merely exemplary; accordingly, other measurements that describe the quantitative or qualitative characteristics of the wafer may also be taken to determine whether the wafers that are being processed by the tool 105 possess the quantitative or qualitative characteristics desired.

Subsequent to receiving the desired lot of wafers at the wafer storage facility 160, the technician delivers the desired lot of wafers to the processing tool at block 230, and the technician informs the manufacturing execution system 115 that the lot of wafers was delivered to the tool 105. The technician may inform the manufacturing execution system 115 that the lot of wafers was delivered to the tool 105 via the operator interface, as previously discussed. The manufacturing execution system 115 then instructs the controller 125 to download the recipe calculations to the processing tool 105 for re-calibration thereof at block 235. In accordance with one embodiment, the manufacturing execution system 115 instructs the controller 125 to download the recipe calculations via the equipment interface 110. In an alternative embodiment, the manufacturing execution system 115 may communicate directly with the controller 125 of the APC framework 120 via the communications link 175. The manufacturing execution system 115 then instructs the processing tool 105, via the equipment interface 110, to process the lot of wafers at block 240 in accordance with the downloaded recipe calculations. According to another embodiment, the recipe calculations may be downloaded to the manufacturing execution system 115 from the controller 125, and then the manufacturing execution system 115 may download the recipe calculations to the processing tool 105 when the technician indicates that the desired lot of wafers has been delivered to the tool 105.

Figure 3:
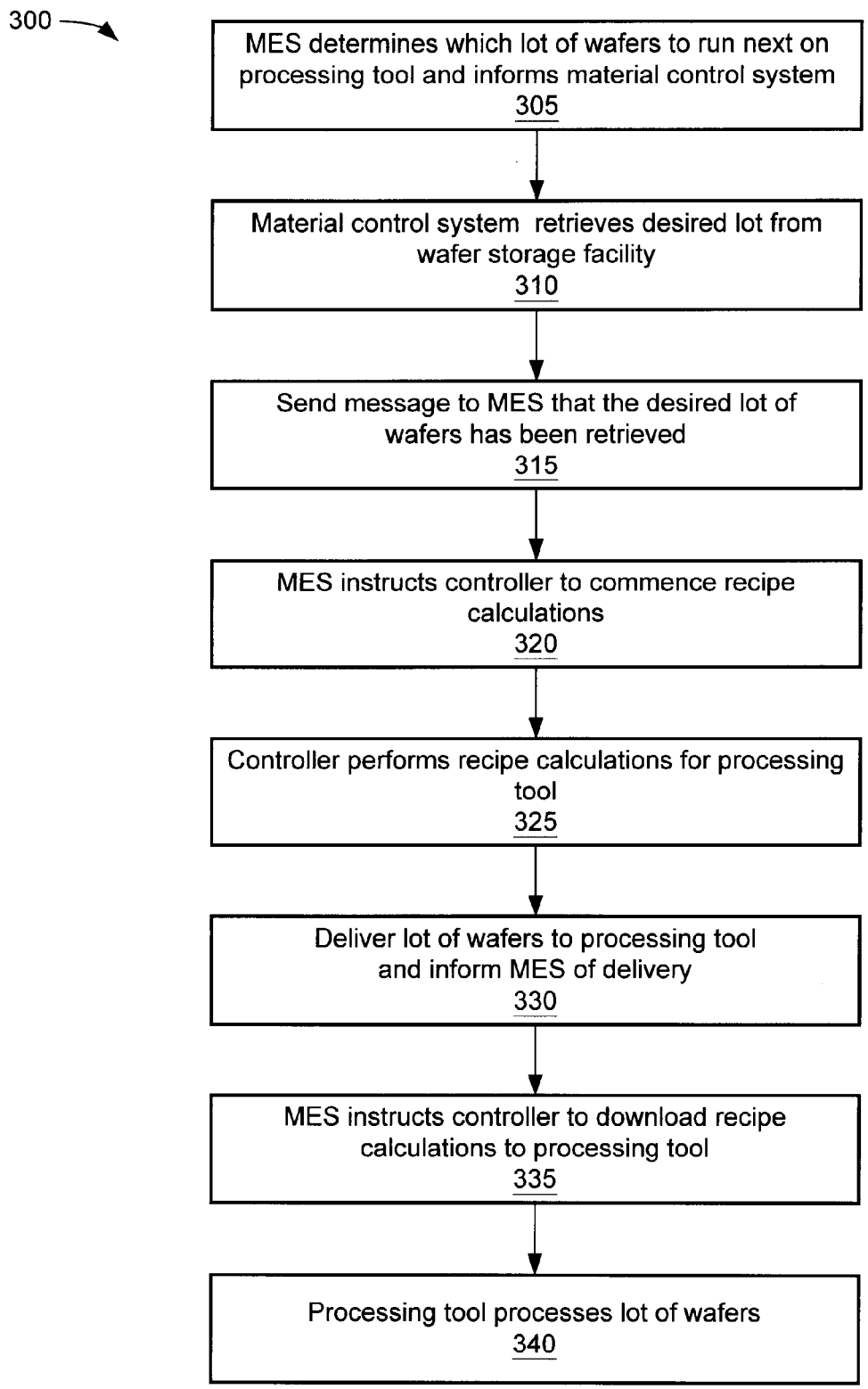
FIG. 3 shows a process performed by the manufacturing system of FIG. 1 in accordance with another embodiment of the present invention.

Turning now to FIG. 3, a process 300 that is performed by the manufacturing system 100 is shown in accordance with another embodiment of the present invention. The process 300 commences at block 305, where the manufacturing execution system 115 determines which lot of wafers needs to be processed on the next run by the processing tool 105, and the manufacturing execution system 115 sends a message to inform the material control system 150 the particular lot of wafers that it has determined to run next on the processing tool 105.

After the manufacturing execution system 115 informs the material control system 150 of the particular lot of wafers that is to run next on the processing tool 105, the material control system 150 retrieves the desired lot of wafers from the wafer storage facility 160 at block 310. According to one embodiment, a message is sent back to the manufacturing execution system 115 at block 315 after the material control system 150 retrieved the desired lot of wafers from the wafer storage facility 160. The message sent to the manufacturing execution system 115 at block 320 triggers the manufacturing execution system 115 to notify the controller 125 of the APC framework 120 to begin the recipe calculations for the lot of wafers that the material control system 150 has retrieved from the wafer storage facility 160. It will be appreciated, however, that the recipe calculations that are being performed by the controller 125 may commence at any point prior to the arrival of the lot of wafers at the processing tool 105 without departing from the spirit and scope of the present invention.

After the manufacturing execution system 115 receives notification that the material control system 150 has retrieved the desired lot of wafers from the wafer storage facility 160 at block 315, the manufacturing execution system 115 sends a message to the controller 125 of the APC framework 120 at block 320 to have the controller 125 commence the recipe calculations for the desired lot of wafers. In one embodiment, the manufacturing execution system 115 may instruct the controller 125 to commence the recipe calculations via the equipment interface 110. In accordance with another embodiment of the present invention, the manufacturing execution system 115 may directly communicate with the APC framework 120 via communication line 175, as opposed to communicating with the framework 120 via the equipment interface 110, without departing from the spirit and scope of the present invention. After receiving a message from the manufacturing and execution system 115, the controller 125 of the APC framework 120 performs the recipe calculations at block 325 using the wafer product data that is obtained from the metrology tool 118. For example, the wafer product data may include film thickness measurements, line width measurements, and/or overlay offset measurements of the wafer. It will be appreciated that these specific measurements that define the wafer product data are merely exemplary; accordingly, other measurements that describe the quantitative or qualitative characteristics of the wafer may also be taken to determine whether the wafers that are being processed by the tool 105 possess the quantitative or qualitative characteristics desired.

After receiving the desired lot of wafers at the wafer storage facility 160 by the material control system 150, an automated transport system (not shown) may be used to deliver the desired lot of wafers to the processing tool at block 330, and informs the manufacturing execution system 115 that the lot of wafers was delivered to the tool 105.

The manufacturing execution system 115 then instructs the controller 125 to download the recipe calculations to the processing tool 105 for re-calibration thereof at block 335. In accordance with one embodiment, the manufacturing execution system 115 instructs the controller 125 to download the recipe calculations via the equipment interface 110. In an alternative embodiment, the manufacturing execution system 115 may communicate directly with the controller 125 of the APC framework 120 via the communications link 175. The manufacturing execution system 115 then instructs the processing tool 105, via the equipment interface 110, to process the lot of wafers at block 340 in accordance with the downloaded recipe calculations. According to another embodiment, the recipe calculations may be downloaded to the manufacturing execution system 115 from the controller 125, and then the manufacturing execution system 115 may download the recipe calculations to the processing tool 105 once the automated transport system has delivered the lot of wafers to the tool 105.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

determining a lot of processing pieces that is to be processed by a processing tool;

retrieving the lot of processing pieces from a remote location;

initiating a predefined set of calculations relating to the operation of the processing tool in anticipation of delivering the lot of processing pieces to the processing tool;

delivering the lot of processing pieces to the processing tool; and processing the processing pieces by the processing tool using the predefined set of calculations.

2. The method of claim 1, wherein retrieving the lot of processing pieces from a remote location further comprises:

instructing a first controller to retrieve the lot of processing pieces from the remote location; and informing a second controller that the lot of processing pieces is being or has been retrieved from the remote location.

3. The method of claim 2, further comprising:

instructing a third controller to perform the predefined set of calculations in response to the second controller being informed that the lot of processing pieces is being or has been retrieved from the remote location.

4. The method of claim 3, further comprising:

instructing the third controller to download the predefined set of calculations performed thereby to the processing tool in response to the lot of processing pieces being delivered to the processing tool.

5. The method of claim 3, further comprising:

instructing the third controller to download the predefined set of calculations performed thereby to the second controller in response to the lot of processing pieces being delivered to the processing tool; and downloading the predefined set of calculations to the processing tool.

6. The method of claim 3, further comprising:

informing the second controller that the lot of processing pieces has been delivered to the processing tool.

7. The method of claim 6, further comprising:

downloading the predefined set of calculations performed by the third controller to the second controller prior to the lot of processing pieces being delivered to the processing tool; and downloading the predefined set of calculations to the processing tool from the second controller in response to the second controller being informed that the lot of processing pieces has been delivered to the processing tool.

8. A system, comprising:

a processing tool adapted to process a lot of processing pieces;

a first controller adapted to retrieve the lot of processing pieces from a remote location;

a second controller adapted to control the processing tool and to determine the lot of processing pieces that is to be processed by the processing tool; and a third controller adapted to perform a predefined set of calculations relating to the operation of the processing tool, wherein said third controller initiates performance of the predefined set of calculations prior to receipt of the lot of processing pieces at the processing tool; and wherein the processing tool is further adapted to process the processing pieces using the predefined set of calculations in response to the processing pieces being delivered to the processing tool.

9. The system of claim 8, wherein the second controller is further adapted to instruct the first controller to retrieve the lot of processing pieces from the remote location and the first controller is further adapted to inform the second controller that the lot of processing pieces is being or has been retrieved from the remote location.

10. The system of claim 9, wherein the second controller is further adapted to instruct the third controller to perform the predefined set of calculations in response to the second controller being informed that the lot of processing pieces is being or has been retrieved from the remote location.

11. The system of claim 10, wherein the second controller is further adapted to instruct the third controller to download the predefined set of calculations performed thereby to the processing tool in response to the lot of processing pieces being delivered to the processing tool.

12. The system of claim 10, wherein the second controller is further adapted to instruct the third controller to download the predefined set of calculations performed thereby to the second controller in response to the lot of processing pieces being delivered to the processing tool, and the second controller being further adapted to download the predefined set of calculations to the processing tool.

13. The system of claim 10, wherein the first controller is further adapted to inform the second controller that the lot of processing pieces has been delivered to the processing tool.

14. The system of claim 13, wherein the third controller is further adapted to download the predefined set of calculations to the second controller prior to the lot of processing pieces being delivered to the processing tool, and the second controller is further adapted to download the predefined set of calculations to the processing tool in response to being informed that the lot of processing pieces has been delivered to the processing tool.

15. A system, comprising:

means for determining a lot of processing pieces that is to be processed by a processing tool;

means for retrieving the lot of processing pieces from a remote location;

means for performing a predefined set of calculations relating to the operation of the processing tool in anticipation of delivering the lot of processing pieces to the processing tool;

means for delivering the lot of processing pieces to the processing tool; and means for processing the processing pieces by the processing tool using the predefined set of calculations.

16. The system of claim 15, wherein the means for retrieving the lot of processing pieces from a remote location further comprises:

means for instructing a first controller to retrieve the lot of processing pieces from the remote location; and means for informing a second controller that the lot of processing pieces is being or has been retrieved from the remote location.

17. The system of claim 16, further comprising:

means for instructing a third controller to perform the predefined set of calculations in response to the second controller being informed that the lot of processing pieces is being or has been retrieved from the remote location.

18. The system of claim 17, further comprising:

means for instructing the third controller to download the predefined set of calculations performed thereby to the processing tool in response to the lot of processing pieces being delivered to the processing tool.

19. The system of claim 17, further comprising:

means for instructing the third controller to download the predefined set of calculations performed thereby to the second controller in response to the lot of processing pieces being delivered to the processing tool; and means for downloading the predefined set of calculations to the processing tool.

20. The system of claim 17, further comprising:

means for informing the second controller that the lot of processing pieces has been delivered to the processing tool.

21. The system of claim 20, further comprising:

means for downloading the predefined set of calculations performed by the third controller to the second controller prior to the lot of processing pieces being delivered to the processing tool; and means for downloading the predefined set of calculations to the processing tool from the second controller in response to the second controller being informed that the lot of processing pieces has been delivered to the processing tool.

* * * * *